United States Patent [19]

Nagata et al.

[11] 4,427,034

[45] Jan. 24, 1984

[54] COATING COMPOSITION FOR PROTECTING INNER SURFACE OF TUBES IN HEAT EXCHANGERS

[75] Inventors: Koji Nagata; Shiro Sato; Akio Ogiso, all of Nagoya, Japan

[73] Assignee: Sumitomo Light Metal Industries, Ltd., Tokyo, Japan

[21] Appl. No.: 296,962

[22] Filed: Aug. 27, 1981

Related U.S. Application Data

[62] Division of Ser. No. 185,194, Sep. 8, 1980, abandoned.

[30] Foreign Application Priority Data

May 23, 1980 [JP] Japan .................................. 55-69324

[51] Int. Cl.$^3$ ................................................ F16L 9/14
[52] U.S. Cl. ...................................... 138/145; 138/143; 138/38; 138/DIG. 6; 165/133; 165/DIG. 19; 524/188; 524/714; 524/456; 106/244
[58] Field of Search .............. 138/140, 141, 143, 145, 138/177, DIG. 6, 38; 260/29.15 B; 165/133, 177, DIG. 8, DIG. 19

[56] References Cited

U.S. PATENT DOCUMENTS

| | | | |
|---|---|---|---|
| 2,125,387 | 8/1938 | Mason | 138/DIG. 6 |
| 2,798,509 | 7/1957 | Bergquist | 138/145 |
| 2,806,718 | 9/1957 | Cook et al. | 138/145 X |
| 3,348,528 | 10/1967 | White | 165/133 X |
| 3,505,269 | 4/1970 | Jeffery et al. | 260/32.8 |
| 3,724,537 | 4/1973 | Johnson | 165/133 |
| 3,959,533 | 5/1976 | Kitaj | 260/33.2 EP |
| 4,089,324 | 5/1978 | Tjaden | 165/133 X |
| 4,098,749 | 7/1978 | Hoshino et al. | 260/29.15 B X |
| 4,133,789 | 1/1979 | Lakshmanan | 260/29.15 B X |

*Primary Examiner*—James E. Bryant, III
*Attorney, Agent, or Firm*—Browdy and Neimark

[57] ABSTRACT

Anti-corrosive coating composition mainly applied to the inner surface of a copper alloy made heat exchanger tube, employed in heat changers, of relatively small diameter and of large length. The composition is prepared by adding an aminoalkoxysilane compound or a combination of plural aminoalkoxysilane compounds at a ratio of 0.1–5% by weight to a film-forming coating composition constituting of as a base substance thereof an organic polymer resin selected from a group consisting of alkyl resin, vinyl resin, polyurethane resin, epoxy resin, and acrylic resin. The composition is preferably applied by means of spray coating method.

7 Claims, No Drawings

4,427,034

COATING COMPOSITION FOR PROTECTING INNER SURFACE OF TUBES IN HEAT EXCHANGERS

This is a division, of application Ser. No. 185,194 filed Sept. 8, 1980 now abandoned.

FIELD OF THE INVENTION

This invention relates to a coating composition for protecting inner surface of a heat exchanger tube employed in various heat exchangers, and more particularly to a corrosion resistant coating composition for protecting inner surface of a copper-alloy heat exchanger tube employed in various heat exchangers which use brackish or sea water as coolant, characterized in excellent water-resistance, wear resistance, adhesive property, suitability for protective-coating an inner surface of a small-diametered long tube, and suitability for making a uniform as well as thin coating.

BACKGROUND OF THE INVENTION

In various heat changers or condensers in power plants, chemical plants, ships, etc. copper alloy tubes have broadly been used as heat exchanger or condenser tubes, such as tubes of so-called special brass which is a brass containing additionally aluminum, arsenic, silicon, etc., or tubes of so-called cupro-nickel alloy composed of copper, nickel, iron, and manganese. Those heat exchanger tubes are vulnerable to some sorts of corrosion or erosion on the inner surface thereof because of their utilizing of brackish water or sea water for cooling the heat exchangers. Corrosion morphology is mainly divided into two forms of either erosion corrosion and pitting corrosion; the former is apt to be caused at the inlet of the tube or places of blockage with foreign matters where turbulence takes place often and the latter occurs all over the inner surface of the tube when polluted brackish or sea water is used for cooling. Corrosion products are simultaneously accumulated to deteriorate the overall heat transfer coefficient within the heat exchangers.

On the other hand an experimental knowledge that deposits of iron oxide in those heat exchanger tubes are helpful in preventing corrosion (the term is used in a broad sense containing erosion unless otherwise stated) of the inner surface of the tubes has contributed greatly to the corrosion resistance of the tube by spreading the practice of injecting ferrous ions artificially into the cooling water. This corrosion resistant phenomenon is chiefly due to the function of restraining cathodic reaction, by a film of ferric hydroxide formed on the inner surface of the tube, in the corrosion reaction. This method can not, however, be said to be an industrially settled stable corrosion preventing technology at the present stage, because the formation of the film of ferric hydroxide still largely depends on various conditions such as extent of pollution of cooling water, whether the disinfection treatment to the water by chlorine is carried out or not, quality of water for example water temperature, pH value of water, amount of ferrous ions injected, distance from the ferrous ions injection point to the heat exchanger tube, flowing speed of the cooling water in the tube, etc. Even in a case where the film of ferric hydroxide is once formed in the tube, far weaker sticking force of the film than the shearing force of an increased turbulent flow, which may take place around the blockage in the tube by shell or other foreign matters contained in the cooling water, is a great fault of this method to be a truly effective anti-corrosion film. Too much expectation of stable corrosion resistance results in formation of too thick film which often degrades the heat transfer of the tube, an essential function thereof, below the allowable limit value. In many plants such as condensers in the power plants, even a cleaning means for removing surplus or excess of film can recently be seen. As a matter of fact such an ideal film removing method as to restore the heat transferring capability sufficiently, while preventing exposure of the ground or base metal, can not be found. In many plants either the heat transference or conductivity or the corrosion resistance is actually sacrificed to some extent.

SUMMARY OF THE INVENTION

This invention was made from such a background. Various experiments and studies performed by taking the above-mentioned circumstances into consideration about the corrosion resistance of the ferric hydroxide film have led the inventors to a conclusion that a coating composition, whose polarization resistance (R) shown in the hereunder formula is more than a predetermined value and the voltage difference thereof from the ground metal is less than a predetermined value, has a similar corrosion resistance to that of the ferric hydroxide film:

$$R = (2\pi^2 a^3/\rho) \times (E_o/I_o)^2$$

wherein
 2a: the internal diameter of the tube (cm),
 $\rho$: the specific resistance of the cooling water ($\Omega$ cm$^2$),
 $E_o$: the voltage drop at the tube end, and
 $I_o$: the current flowed through the tube (A).

Further studies on various coating compositions for forming a film excellent in water-resistance were made by assuming the required conditions for such compositions to be water-resistance, adhesive property, wear-resistance, capability of coating in uniform thickness, etc. And tubes interiorly coated with such compositions were set at their capability or performance value as follows:

the polarization resistance value (R) from the view point of the corrosion resistance is not less than 5000 $\Omega$ cm$^2$;

the voltage difference ($\Delta$E) between the film and the ground metal of the tube is within 0.2 V;

the value of heat conducting resistance (fouling factor) from the view point of heat transfer should be not more than 0.0001 m$^2$h°C./Kcal.

The experiments and studies clarified that film-forming materials or composition made chiefly from epoxy resin, alkyd resin, vinyl resin, polyurethane resin as a base, for example a paint or coating, are by and large satisfactory in fulfiling the above-mentioned conditions and capable of forming an anti-corrosion film better than the ferric hydroxide film. According to the studies, however, any one of such materials is still defective and premature to substitute for the conventional ferric hydroxide film.

Discussing further in detail; the epoxy resin based material is according to the studies far superior to others in wear-resistance, it is however defective in being (a) vulnerable to scaling off or being scraped in a filmy state particularly at the tube end portion, and (b) inferior to other materials in respect of easiness of spray coating operation, for example, it takes much time in spraying, resulting in ununiform coating or producing drips of material. It has become evident in conclusion that this material is improper for getting a uniform film over the whole length of the inner surface of a long tube such as having a size, outer diameter 25.4 mm×wall thickness 1.25 mm×length 15000 mm. The objects to be coated in this field are in many cases heat exchanger tubes of relatively small diameter such as 10-40 mm and large length, for example, from 3 m to 40 m, preferably 5 m to 40 m. For fulfilling the above-mentioned performance conditions in uniformly coating the inner surface of tubes of such small diameter and large length, spraying is considered to be almost the sole way. So it is decisive to adopt spraying in this sense, and the suitability of coating materials for spraying is therefore of fatal importance.

The alkyd resin based material is considered to be excellent in spraying and therefore getting a uniform film, but somewhat unsatisfactory in wear-resistance. In the experiments hereunder-mentioned coated films formed on the inner surface of the sample tubes gradually became thinner as to finally expose the ground metal: (a) sea water containing suspended sands of 500μ×500 ppm was flowed through the tube at a speed of 2 m/s continuously for three months, and (b) a sponge ball stuck with silicon carbide grains of a diameter larger by 2 mm than the internal diameter of the tube was passed through the tube ten times a day for ten days. This sort material leaves something to be desired, as can be understood from the above, in improving the wear-resistance.

In the other materials such as vinyl resin based, polyurethane resin based, etc., showed more or less similar tendency to the alkyd resin based material. They showed insufficiency in the wear-resistance in a general way.

The present invention was completed by taking those circumstances and experimental data fully into consideration upon a further step of research and study. It is therefore a primary object of this invention to provide a coating composition suitable for protecting the inner surface of heat exchanger tubes of small diameter and large length against corrosion, being excellent in water-resistance, wear-resistance, and adhesive property.

It is another object of this invention to provide a protective coating composition suitable for spray coating operation and for getting a uniform film less than 50μ in thickness, over the whole length of the inner surface of a long tube.

It is still another object of this invention to provide heat exchanger tubes with an artificial protective film on the inner surface which has excellent corrosion resistance without appreciable amount of loss of heat transfer and is much superior to the conventional protective film of ferric hydroxide.

Other objects of this invention will become apparent to those skilled in the art from the following detailed description of the preferred embodiments.

This invention for achieving the above-mentioned objects is characterized in that 0.1-5% by weight of aminoalkoxysilane compound is added to a liquid coating composition containing as a film-forming material at least one organic polymer resin selected from a group consisting of alkyd resin, vinyl resin, polyurethane resin, epoxy resin and acrylic resin.

In this invention one or more than one kind of organic polymer resin is selected from a group consisting of alkyd resin, vinyl resin such as polymers or copolymers of vinyl chlorides or vinyl acetates, polyurethane resin, epoxy resin, and acrylic resin such as polymers or copolymers of acrylic esters, as a base material or substance for film-forming, for being dissolved in a suitable solvent, for example alcohols, esters, ethers, ketons, aliphatic hydrocarbons, aromatic hydrocarbons, etc., so as to be prepared into a film-forming liquid composition which may be dried at a room temperature. In this preparation process of the liquid composition for film-forming coating, addition of pigments such as red lead, zinc chromate, iron oxide is allowable, if necessary. Above all addition of iron oxides is welcome because of expectation for forming a corrosion resistant ferric hydroxide film. As a liquid composition for the film-forming of this type, synthetic resin coatins, vanishes, primers, etc. of respective series on the market can be preferably utilized.

Addition of 0.1-5% by weight of aminoalkoxysilane compound to a composition of liquid form for film-forming has remarkably improved the suitability for spray coating operation of the composition finished, and enhanced parallelly the corrosion resistance and the wear-resistance as well as the adhesive property of the coating film obtained from the composition, while maintaining good performance of heat transfer on the other hand. In other words, a film layer coated with the invented composition added with aminoalkoxysilane compound of predetermined amount by spraying operation on the inner surface of the tube, whose thickness being held down to less than 50μ so as to adjust the heat conducting resistance or fouling factor not more than 0.0001 m$^2$h°C./Kcal, was successful to be of desired small thickness effective enough for keeping good heat transfer performance and for holding good resistance against wear and corrosion. Resistibility to wear or corrosion of the coating with the invented composition containing the aminoalkoxysilane has been proved to be particularly effective against rubbing and impacting of shells or drifting sand grains passing through the tube flowed in the cooling sea water. Even in the exposed places of the ground metal of the tube due to possible scratching or scraping of the film, no progress of corrosion or enlargement of peeling or scaling of the film layer starting therefrom was observed.

As for the adding amount of such aminoalkoxysilane to the liquid film-forming composition, too small amount less than 0.1% by weight is undesirable because of falling short of the excellent effect expected in accordance with this invention, and too much more than 5% by weight should be avoided on the other hand because of (a) no further expectation of anti-corrosion effect, (b) deterioration of mutual solubility with the organic polymer resin as a base substance, (c) deterioration of coatability on the metal surface, or (d) occurrence of ununiform thickness of a film due to deceleration of drying or hardening of the coating at a room temperature.

Aminoalkoxysilane compounds preferably applicable to this invention can be designated by the following rational formula,

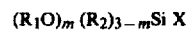

$$(R_1O)_m (R_2)_{3-m} Si\ X$$

wherein $R_1$ and $R_2$ are respectively alkyl group which may have preferably one to four carbon atoms, and X is aminoalkyl or N-substituted aminoalkyl group. In general, it is most preferable to be an aminoalkyl group having one to four carbon atoms. And m is an integer in the range of 1-3. As compounds which can be designated by these rational formula, under-mentioned substances are exemplarily enumerated: aminomethyltrimethoxysilane, aminoethyltrimethoxysilane, aminopropyltrimethoxysilane, aminopropylmethyldimethoxysilane, aminopropyltriethoxysilane, aminopropyltripropoxysilane, N-aminoethyl-aminopropyltrimethoxysilane, N-aminoethylaminopropylmethyldimethoxysilane, etc. A combination of more than one silane compound has been proved particularly effective in the performance as an adding material or an additive. Such combination is highly recommendable in this invention.

The composition in this invention thus obtained is adjusted for being adapted to a spray coating of the interior of heat exchanger tubes or condenser tubes of a small diameter in the order of 10-40 mm and a large length in the order of 3-40 m, specifically 5-40 m. It is prepared for being usable at a room temperature or so, so as to be dried or hardened when it is used for repairing or re-coating of the possibly damaged tubes once disposed in place for working.

The invented composition is particularly used by preference to heat exchanger tubes of heat exchangers such as condensers, and above all to the inner surface of tubes of copper alloy, small in diameter and large in length, with great effect. For attaining the earlier stated effects of this invention, particularly when it is applied to the interior coating of tubes, conventional spray coating method carried out under known conditions will do. However, spraying processes and tools proposed by the inventors of this invention in the already filed patent applications TOKU-GAN-SHO-55(1980)-63681, TOKU-GAN-SHO-55(1980)-80674, and TOKU-GAN-SHO-55(1980)-91913 as well as a spray nozzle disclosed in Utility Model application JITSU-GAN-SHO-54(1979)-147890 are highly recommendable.

DETAILED DESCRIPTION OF THE INVENTION BY DISCLOSING SOME EXAMPLES

Some examples will be shown for the purpose of further concretely clarifying the invention. It goes without saying that this invention is not limited to those examples only, so it will not be restricted by them at all.

EXAMPLE 1

By means of adding 0.5% of N-$\beta$-(aminoethyl)-$\gamma$-aminopropylmethyldimethoxysilane to an alkyd resin anti-corrosive coating on the market, specifically LZI PRIMER manufactured by the Chugoku Toryo Kabushiki Kaisha and mixing both well to be uniform, a liquid coating composition in accordance with this invention was prepared.

The coating composition thus obtained was applied to the interior coating of a heat exchanger seamless tube, for condenser, being "Aluminum Brass Seamless Pipes and Tubes for Condenser and hat-Exchanger" according to JIS (Japanese Industrial Standard) H 3300 (1979). The length of the tube was approx. 15 m; and the inner diameter thereof was approx. 23 mm. The composition, i.e., a paint material for coating was sprayed in an atomized state, wherein the spray nozzle shown in the UM-JITSU-GAN-SHO-54(1979)-147890 was employed, being supplied with the coating composition adjusted at its viscosity at 25 sec. (20° C.) by No. 4 Ford viscosity cup, at its spraying amount at 40 ml/min., and at its air blowing amount in the nozzle end at 300 l/min. The nozzle in the state of spraying the atomized composition was moved from one end of the tube interior to the other end for coating all over the inner surface of the heat exchanger tube, followed by blowing of heated air of 30°-50° C. therethrough for five hours at a speed 1.5-2.5 m/sec. Upon being dried and hardened a coated film of 20$\mu$ thickness was obtained.

EXAMPLE 2

By means of adding respectively 0.1%, 0.2%, 0.5%, 2%, and 5% by weight of either N-$\beta$-(aminoethyl)-$\gamma$-aminopropylmethyldimethoxysilane or $\gamma$-aminopropyltriethoxysilane to the alkyd resin anticorrosive coating on the market, many kinds of compositions for coating were prepared. Upon spraying each of those composed coatings, in a similar way of spraying to that in Example 1, to the interior of heat exchanger aluminum brass tubes of predetermined size and quality. In each of those a coated film of 20$\mu$ thickness was obtained.

EXAMPLE 3

Only differences from the Example 1 were the employment of a mixture of N-$\beta$-(aminoethyl)-$\gamma$-aminopropyltrimethoxysilane, N-$\beta$-(aminoethyl)-$\gamma$-aminopropylmethyldimethoxysilane, and $\gamma$-aminopropyltriethoxysilane as an aminoalkoxysilane compound and the variation of adding ratio to three stages of 0.5%, 2.5% and 5%. A coated film of 20$\mu$ thickness was obtained by the same method as in the Example in each case of those in the heat exchanger tubes of predetermined size and quality.

EXAMPLE 4

By means of adding two kinds of aminoalkoxysilane compounds utilized in the Example 2 to a vinyl resin coating on the market, specifically SHINTO-WASH #20 manufactured by the Shinto Paint Co., Ltd., respectively at 0.2% by weight, a coated film of 20$\mu$ thickness was obtained by the same method as in the Example 1 in each case in a heat exchanger tube of predetermined size and quality.

EXAMPLE 5

By means of adding two kinds of aminoalkoxysilane compounds utilized in the Example 2 to a polyurethane resin coating on the market, specifically POLIN-PRIMER manufactured by the Shinto Paint Co. Ltd., respectively at 0.2% by weight, a coated film of 20$\mu$ thickness was obtained by the same method as in the Example 1 in each case in a heat exchanger tube of predetermined size and quality.

EXAMPLE 6

By means of adding two kinds of aminoalkoxysilane compounds utilized in the Example 2 to an epoxy resin coating of two liquids and room-temperature-drying type, specifically MILLION No. 1A manufactured by the Kansai Paint Co. Ltd., respectively at 0.2% by weight, a coated film of 20$\mu$ thickness was obtained by the same method as in the Example 1 in each case in a heat exchanger tube of predetermined size and quality.

Comparison of performance tests

As to comparative observation on various coated films formed inside the seamless aluminum brass heat exchanger tubes, of small diameter and large length, in the Examples 1-6 and in the following comparative examples carried out as in the hereunder-mentioned 1-9, the data concerning the film-forming conditions and the anti-corrosion performance chiefly against sea water will be tabulated at the end of this description, according to some predetermined test conditions and estimation criteria.

Comparative examples 1–4

By means of respectively using, in each comparative example, a commercial alkyd resin coating (in comparative example (1), a commercial vinyl resin coating (in comparative example (2), a commercial polyurethane resin coating (in comparative example (3), and a two liquids and room-temperature-drying type epoxy resin coating (in comparative example (4)), but without adding any of the aminoalkoxysilane compounds, a coated film of 20μ thickness was obtained by the same method as in the Example 1 in each case in a heat exchanger tube of predetermined size and quality.

Comparative Example 5

By adding a commercial silicone resin as a paint additive (YF 3859 manufactured by the Toshiba Silicone Co. Ltd.) to a commercial alkyd resin anticorrosive coating at the ratio of 0.5% by weight, a coated film of 20μ thickness was obtained by the same method as in the Example 1 in a heat exchanger tube of predetermined size and quality.

Comparative Example 6

By using only a commercial room-temperature-drying type silicone-alkyl resin coating (TSR 184 manufactured by the Toshiba Silicon Co. Ltd.), a coated film of 20μ thickness was obtained in the same method as in the Example 1 in a heat exchanger tube of predetermined size and quality.

Comparative Example 7

By flowing natural sea water added with ferrous ions at 0.3 ppm through a brass-made heat exchanger tube of the same type as in the Example 1 at the flow rate of 2 m/sec. for one month, a film formation of ferric hydroxides could be observed therein.

Comparative Example 8

By adding known vinyltriethoxysilane as a paint additive at a ratio of 0.5% by weight to a commercial alkyd resin anticorrosive coating, a coated film of 20μ thickness was obtained by the same method as in the Example 1 in a heat exchanger tube.

Comparative Example 9

By adding γ-methacryloxypropyltrimethoxysilane at a ratio of 0.5% by weight to a commercial alkyd resin anticorrosive coating, a coated film of 20μ thickness was obtained by the same method as in the Example 1 on the inner surface of a heat exchanger tube.

Methods and conditions of tests observed and estimated

As to the film forming condition a tube of 15 m long in its whole length was observed, by splitting it longitudinally, by sight and by measuring the film thickness. When the thickness of the film was within the sphere of 10μ–30μ it was estimated as normal. The tests on corrosion by sea water were carried out from the following four different angles, and estimated by ranking into four classes depending on the remaining amount of the film after the tests.

Test condition (A):
  Natural sea water added with sulfur ions of 0.05 ppm, which is called polluted sea water, was flowed through at a rate of 2 m/sec. and ten of sponge balls of 26 mmφ larger by 2 mm in diameter than the inner diameter of the tube were passed through the tube every day for the purpose of removing the matters stuck to the inner surface of the tube, ranging throughout 24 months of the corrosion test.
  Intermediate observations at the lapse of 3 months and 12 months were performed along with the final observation at the lapse of 24 months, concerning the deterioration of the film, chiefly the diminishing of the film thickness.

Test condition (B):
  By flowing sea water containing suspended sand grains with the grain size of 500μ at the amount of 500 ppm through the tube at a rate of 2 m/sec. for six months long for observing the deterioration of the film (diminishing of the film thickness) at lapse of 1 month, 3 months and 6 months.

Test condition (C):
  By disposing an orifice in the tube capable of producing the maximum flow rate of 10 m/sec. for impacting the sea water of this flow rate onto the tube wall, deterioration of the film due to a continuous flowing of the water in 24 months was observed at the lapse of 12 months and 24 months.

Test condition (D):
  After scratching a part of the film with a knife for exposing the ground metal, a continuous flowing of sea water through a tube at a rate of 2 m/sec. was performed as long as 6 months. Progress of damage or scar of the scratched portion as well as the occurrence of blistering was observed.

Signs of classified estimation of the film forming condition
  O: normal.
  Δ: ununiform portion of the film thickness can be locally observed.
  X: ununiform film thickness can be observed throughout the whole length of the tube.

Signs of anti-corrosion effect estimation
  ⊚ : no defect found or the diminishing of the film thickness remained within 20% after the test.
  O: the diminishing of the film thickness after the test was within 20–50%.
  Δ: the diminishing of the film thickness after the test was within 50–80%.
  X: exposing of the ground metal.

In the table hereunder which concentrates the experimental data on the Examples of this invention, the fact that formation of a coating film of good performance extremely improved in its anti-corrosion effect can be realized by means of adding a aminoalkoxysilane compound to a paint to be used in coating is clearly prooved.

It is understood that the above description is merely illustrative of preferred embodiments of our invention of which many variations may be made within the scope of the following claims without departing from the spirit thereof.

TABLE

| | Amount of silane compound addition by percentage | Whether the film formation is normal or not | A (months) | | | B (months) | | | C (months) | | D (months) |
|---|---|---|---|---|---|---|---|---|---|---|---|
| | | | 3 | 12 | 24 | 1 | 3 | 6 | 12 | 24 | 6 |
| Examples | | | | | | | | | | | |
| 1 | 0.5 | O | ◎ | ◎ | O | ◎ | O | △ | ◎ | O | O |
| 2 | 0.2 | O | ◎ | ◎ | O | ◎ | O | △ | O | O | O |
| | 0.4 | O | ◎ | ◎ | O | ◎ | O | △ | ◎ | O | O |
| | 1.0 | O | ◎ | ◎ | O | ◎ | ◎ | △ | ◎ | O | O |
| | 4 | O | ◎ | ◎ | O | ◎ | ◎ | O | ◎ | ◎ | △ |
| | 10 | △ | ◎ | ◎ | O | ◎ | ◎ | O | ◎ | ◎ | X |
| 3 | 0.5 | O | ◎ | ◎ | O | ◎ | ◎ | O | ◎ | O | O |
| | 2.5 | O | ◎ | ◎ | O | ◎ | ◎ | O | ◎ | ◎ | O |
| | 5 | O | ◎ | ◎ | ◎ | ◎ | ◎ | ◎ | ◎ | ◎ | △ |
| 4 | 0.4 | O | ◎ | ◎ | O | ◎ | ◎ | O | ◎ | O | O |
| 5 | 0.4 | O | ◎ | ◎ | O | ◎ | O | O | ◎ | O | O |
| 6 | 0.4 | O | ◎ | ◎ | O | ◎ | ◎ | O | ◎ | ◎ | X |
| Comparative Examples | | | | | | | | | | | |
| 1 | 0 | O | ◎ | O | △ | O | △ | X | O | △ | O |
| 2 | 0 | O | ◎ | O | △ | O | △ | △ | O | △ | O |
| 3 | 0 | O | ◎ | O | △ | O | △ | X | O | △ | △ |
| 4 | 0 | △ | ◎ | ◎ | △ | ◎ | O | O | ◎ | △ | X |
| 5 | 0 | O | ◎ | △ | X | O | O | X | O | △ | O |
| 6 | 0 | △ | △ | X | X | △ | X | — | X | — | X |
| 7 | 0 | — | O | X | X | △ | X | — | X | — | — |
| 8 | 0.5 | O | ◎ | O | △ | O | O | △ | O | △ | O |
| 9 | 0.5 | O | ◎ | O | △ | O | O | △ | O | △ | O |

What is claimed is:

1. A heat exchanger tube having a small diameter in the order of 10–40 mm and a large length in the order of 3–40 m and provided on the inner surface with an artificial protective film less than 50μ in thickness, not more than 0.0001 m²h°C./Kcal in fouling factor and not less than 5000 Ω cm² in polarization resistance, said artificial protective film being formed by a spray coating of a coating composition prepared by adding at least one aminoalkoxysilane compound at a ratio of 0.1–5% by weight to a liquid coating composition including as a film-forming material at least one organic polymer resin selected from a group consisting of alkyd resin polyurethane resin, epoxy resin, and acrylic resin.

2. A heat exchanger tube as claimed in claim 1, wherein said aminoalkoxysilane compound is selected from a group consisting of aminomethyltrimethoxysilane, aminoethyltrimethoxysilane, aminopropyltrimethoxysilane, aminopropylmethyldimethoxysilane, aminopropyltriethoxysilane, aminopropyltripropoxysilane, N-aminoethyl-aminopropyltrimethoxysilane, and N-aminoethyl-aminopropylmethyldimethoxysilane.

3. A heat exchanger tube as claimed in claim 2, wherein said aminoalkoxysilane compound employed is a combination of more than one compound selected from said group.

4. A heat exchanger tube as claimed in claim 1, or claim 2, or claim 3, wherein said heat exchanger tube is made of a copper alloy.

5. A heat exchanger tube as claimed in claim 1, or claim 2, or claim 3, wherein said protective film comprises a thin film on the inner surface of said heat exchanger tube of uniform thickness.

6. A heat exchanger tube as claimed in claim 3, wherein the combination of said aminoalkoxysilane compounds is that of N-β-(aminoethyl)-γ-aminopropylmethyldimethoxysilane and γ-aminopropyltriethoxysilane.

7. A heat exchanger tube as claimed in claim 3, wherein the combination of said aminoalkoxysilane compounds is that of N-β-(aminoethyl)-γ-aminopropyltrimethoxysilane, N-β-(aminoethyl)-γ-aminopropylmethyldimethoxysilane and γ-aminopropyltriethoxysilane.

* * * * *